United States Patent [19]

McQueen

[11] Patent Number: 4,709,503

[45] Date of Patent: Dec. 1, 1987

[54] CRAWLING INSECT TRAP

[76] Inventor: Robert McQueen, 2744 Shipley Ter., SE., Washington, D.C. 20020

[21] Appl. No.: 789,645

[22] Filed: Oct. 21, 1985

[51] Int. Cl.⁴ .............................................. A01M 1/14
[52] U.S. Cl. ......................................... 43/114; 43/121
[58] Field of Search ................. 43/114, 121, 116, 117, 43/132.1

[56] References Cited

U.S. PATENT DOCUMENTS

| 514,388 | 2/1894 | Smith | 43/121 |
|---|---|---|---|
| 790,876 | 5/1905 | Andrus | 43/121 |
| 1,208,987 | 12/1916 | Lacht | 43/121 |
| 3,023,539 | 3/1962 | Emerson | 43/114 |
| 3,913,259 | 10/1975 | Nishimura | 43/114 |
| 4,161,079 | 7/1979 | Hill | 43/114 |
| 4,208,828 | 6/1980 | Hall | 43/114 |
| 4,349,981 | 9/1982 | Sherman | 43/114 |

FOREIGN PATENT DOCUMENTS 37987 10/1923 Norway ............................... 43/114

OTHER PUBLICATIONS

Michigan Entomological Society Newsletter, vol. 29, No. 1, Mar. 12, 1984.

Primary Examiner—Kurt Rowan
Attorney, Agent, or Firm—Vorys, Sater, Seymour & Pease

[57] ABSTRACT

A crawling insect trap including a housing and one or more shelves positionable in the housing. The housing is formed from a top, bottom, pair of opposite side walls, and an end wall. The side walls and the end wall are each connected to the top and the bottom. The housing is made from a hard material such as a hard plastic so as to define a generally rigid structure. One or more shelves are positioned in the housing in pairs of oppositely disposed U-shaped channels secured to the side walls. Baited sticky surfaces are provided on either side of each of the shelves. Each of the outer surfaces of the housing has a plurality of elliptical openings passing therethrough. Thus when insects attracted to the dark baited interior of the housing crawl through the holes they will become stuck to the sticky surfaces. When the surfaces become covered with the insects, the shelves can be removed and new shelves inserted. It is not necessary to replace the entire trap when the surfaces become covered with insects. The end of the housing opposite the end wall is provided a cover which is movable between an open position in which the interior of the housing is exposed and the shelves can be replaced and a snap closed position. When in its closed position the housing with the exception of the small elliptical holes is closed, and, thus, the interior of the housing including the baited sticky surface with the insects stuck thereto is not generally visible. Further, a sticker is provided on the bottom surface so that the entire housing can be secured to any surface including vertical surfaces and lower horizontal surfaces.

21 Claims, 2 Drawing Figures

CRAWLING INSECT TRAP

BACKGROUND OF THE INVENTION

The present invention relates to devices for trapping and killing crawling insects. It more particularly relates to baited glue traps for trapping and controlling the population of cockroaches and waterbugs.

Numerous devices for trapping crawling insects are known. One example is the "Mr. Sticky" distributed by Mitsuboshi Boeki, Inc. It is basically used to indicate where infestation exists and the direction from which the crawling insects are coming and thus to target the areas for clean-out. It essentially is a foldable, cardboard, open-ended tent having a baited sticky floor. When the floor becomes crowded with pests the entire trap is disposed of. When the insects (adults, nymphs and eggs) and their body parts become stuck to the floor it presents a rather unsightly mess which can easily be seen through either end of the tented trap.

Another example of a crawling insect trap is the "Roach Motel" distributed by Boyle-Midway, Inc., of New York, New York. It similarly comprises a fold-up cardboard box having both of its ends open and baited sticky surface(s) in the interior. Again, the unsightly insect mess stuck to the surface(s) can be easily seen through both ends. Also, the structure is very flimsy and cannot withstand any weight on it. Further, when the baited sticky surface is full with insects the entire structure must be disposed of.

A further example of a trap is the "Stick-A-Roach" manufactured by J. T. Eaton Company, Inc. It comprises simply a tray having a prebaited formula and a glue surface for catching the insects. The entire glue surface is exposed so the captured insect mess is visible. The surface is also exposed so that birds, small pets, or other non-target animals can accidentaly become stuck to the glue and be injured or killed. Similarly, when this trap is filled with insects the entire trap is discarded in a waste container.

OBJECTS OF THE INVENTION

Accordingly, it is the principal object of the present invention to provide an improved crawling insect trap.

Another object of the present invention is to provide an improved crawling insect trap which is safe around food, children, and pets.

A further object of the present invention is to provide a novel crawling insect trap which is designed for long term crawling insect control and reduction of insect population.

A still further object of the present invention is to provide an improved crawling insect trap which is able to withstand small weights and is less likely to be crushed.

Another object is to provide a crawling insect trap which is compact and easily positioned unnoticed in structures.

A further object is to provide a novel crawling insect trap which is inexpensive and easily fits on any surface.

A still further object is to provide a novel insect trap which hides the unattractive mess of insect pests, adults, nymphs and their eggs stuck to the glue surface.

Another object is to provide a novel crawling insect trap which can be easily set in narrow enclosed spaces.

A further object is to provide a novel insect trap which better attracts crawling insect pests including cockroaches, waterbugs, crickets, palmetto bugs and many other annoying crawling insects.

A still further object is to provide an improved crawling insect trap design which is less likely to capture birds, small pets and other non-target animals.

Another object is to provide an improved insect trap which is safe to use in hospitals, restaurants, day care centers and other places where poisons are banned.

Other objects and advantages of the present invention will become apparent to those persons having ordinary skill in the art to which the present invention pertains from the foregoing description taken in conjunction with the accompanying drawings.

DESCRIPTION OF THE PREFERRED EMBODIMENT

Figure 1:
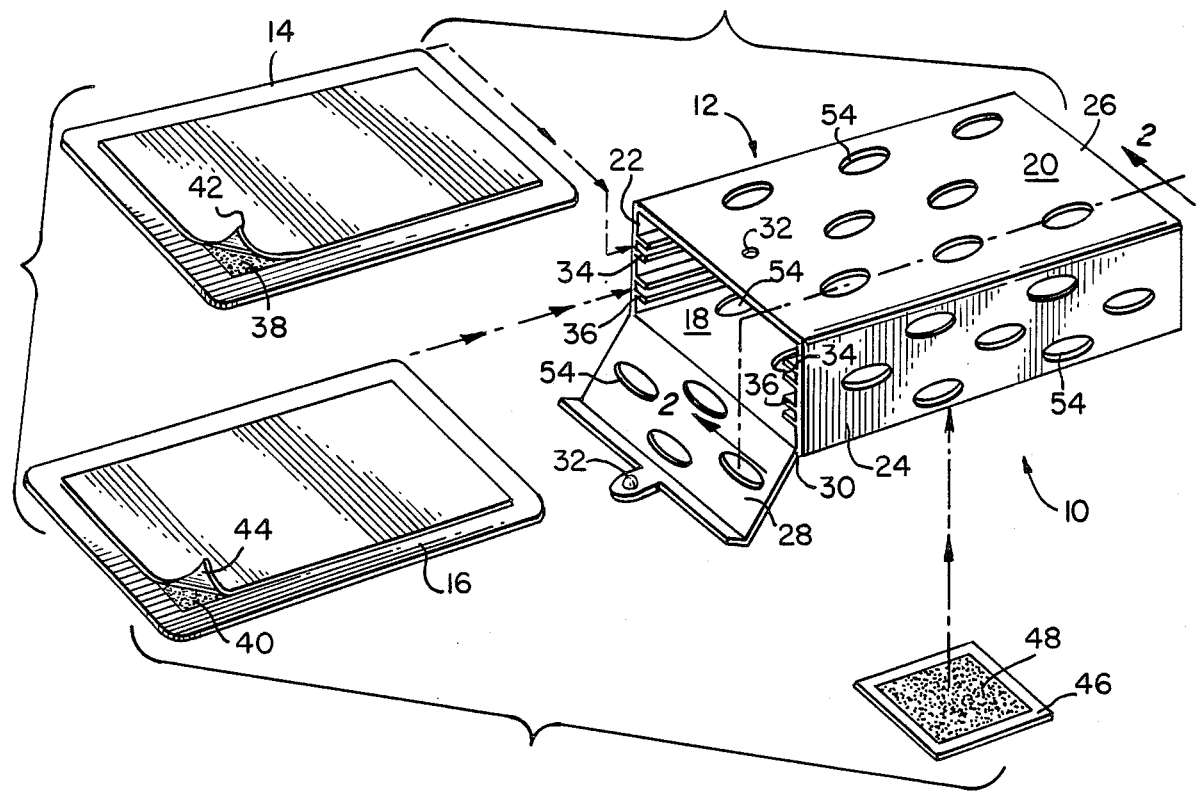
FIG. 1 is a perspective view of a crawling insect trap of the present invention illustrating parts thereof in exploded relation.

A crawling insect trap of the present invention is illustrated generally at 10 in FIG. 1. It is seen to basically comprise a housing shown generally at 12 and removable panels or shelves 14 and 16 positionable within housing 12.

Figure 2:
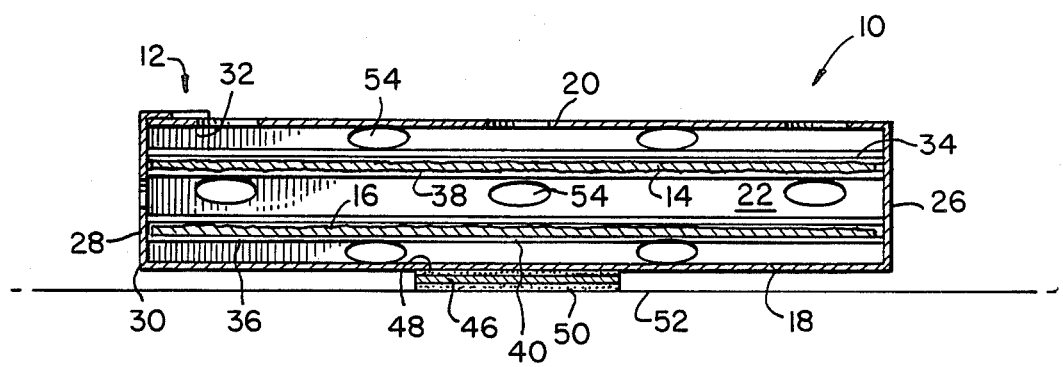
FIG. 2 is a cross-sectional view taken along line 2—2 of FIG. 1.

Housing 12 has a box-like configuration. It is seen to comprise a bottom 18, a top 20, a pair of opposite side walls 22, 24 interconnecting the top and bottom, an end wall 26 interconnecting the top and bottom and fixed thereto, and an opposite end wall or cover 28. The exterior surfaces of the housing can be of any suitable color or wood-type grain to match the surrounding structures and to make trap 10 less visible and obtrusive. As shown, opposite end cover 28 is hinged at its lower edge 30 to bottom 18 so that it can be moved from an open position (shown in FIG. 1) exposing the interior of housing 12 for removal and replacement of shelves 14, 16, as will be described later, and a closed position (shown in FIG. 2) for securing shelves 14, 16 in housing 12 and also for hiding the interior of the housing and the shelves from the exterior. End cover 28 is secured in its closed position by a snap 32 or any other suitable securing means.

Shelves 14, 16 are removable from housing 12 for replacement thereof. Two pairs of oppositely positioned and aligned U-shaped channels 34, 36 are secured to the opposite side walls 22, 24. The shelves are then slid into position in the space defined by U-shaped channels 34, 36. As illustrated, two shelves are provided, however it is within the scope of the present invention to provide only one centrally located shelf (and also to provide three or more spaced shelves). Each of the shelves has sticky glue surfaces on both of its sides 38, 40 so that insects can be trapped on both sides. For ease of handling each of the glue sides has a removable or peelable glue cover 42, 44 which protects the sticky material and is removed immediately prior to inserting shelves 14, 16 into housing 12. It is also within the scope of the present invention to bait the sticky surface. A suitable known bait contains powered chyrsalis (84.5%), sodium enzoate (0.5%) and precipitated calcium carbonate (15.0%) and is either laced in the center of the sticky surface or scattered on the surface after removing the peeloff paper.

A glued sticker 46 having glue on both sides 48, 50 is attached to bottom 18 of the housing 12. After the glue cover is removed from the bottom of sticker 46, housing 12 can be secured to any surface, such as shown at 52 in FIG. 2. It is especially useful for securing it to out-of-the-way vertical it to out-of-the-way vertical surfaces or the lower surface of a horizontal member, such as in a cupboard. U-shaped channels 34, 36 hold shelves 14, 16 in place in housing 12 when the housing is in an upside down or non-horizontal orientation. Trap 10 thus has the flexibility of being placed in many hard to reach areas and also in locations which are not visible. In contrast, prior art traps do not have this feature and must rest on a horizontal surface such as a floor or shelf. Thus, the present trap can be easily fitted on walls, underneath tables, behind bookcases, inside closets, cabinets, medicine cabinets, inside chests and dresser drawers.

Each of the surfaces of the housing, namely top 20, bottom 18, sidewalls 22, 24 and end wall 26 and end cover 28 is provided with a plurality of elliptical holes 54 through which the insects can crawl to get to the dark interior of the housing and also to the baited material. As can be appreciated, the holes, while large enough (1/6 to ⅛ inch in diameter) to provide easy access for insects to the interior of the housing and its baited glue surfaces from all directions, are not so large as to effectively expose the interior of the housing and the shelf surfaces. Also the housing, since it is totally enclosed, provides an enclosed, darker, more inviting and insect beckoning trap than prior traps.

Housing 12 is constructed from a solid material such as hard plastic, to define a structure which can support small weights up to generally twenty pounds. It thus is not as likely to be crushed as the prior flimsy cardboard structures. Although illustrated as a box configuration having dimensions of four inches by two inches by one inch, any suitable configuration such as a semi-cylinder can be used.

Thus, the use of the present trap 10 is very easy. The desired location is selected, the peel-off paper of the glue sticker is removed and glue sticker 46 adhered to bottom 18 of the housing. The peel-off panel on the opposite side of the glue sticker is removed and housing 12 is adhered to the desired surface 52. Shelves 14, 16 can be placed in housing 12 either before the housing is secured in the desired location or after. To secure shelves 14, 16 it is simply a matter of removing the peel-off glue covers from both sides of all the shelves and inserting the shelves through the open end of the housing into position. Then housing end cover 28 is closed by snapping snap 32, and an effective semi-permanent structure for capturing annoying crawling insects is defined. When shelves 14, 16 become filled with insects it is a simple process of unsnapping snap 32 of end cover 28, removing shelves 14, 16, and inserting new shelves. It is expected that the shelves will only cost pennies and it is not necessary to replace the entire housing each time the baited glued surfaces become filled. The present invention thereby provides a very inexpensive, easy to use and safe means for trapping and destroying insects.

From the foregoing detailed description, it will be evident that there are a number of changes, adaptations, and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A crawling insect trap comprising:
   a housing including a top, a bottom, and a side wall connecting said bottom and said top,
   said side wall including at least one insect entry side wall opening through it to the interior of said housing,
   said top including at least one insect entry top opening through it to the interior of said housing,
   a shelf positionable in said housing,
   said shelf having a first shelf side, an opposite second shelf side and a first sticky insect-catching material on said first shelf side,
   said entry side wall opening providing access for an insect from the exterior of said housing to said first sticky insect-catching material,
   said shelf further including second sticky insect-catching material on said second shelf side,
   said housing including a first securing means for releasably securing said shelf in said housing disposed so that said shelf can be positioned in place in said housing spaced from and between said top and said bottom and can also be removed from said housing,
   said housing further including an end cover movable between an open position providing access to the interior of said housing and defining an end opening through which said shelf can pass into and out of said housing and a closed position extending generally between said top and said bottom,
   said first shelf side facing said bottom when said shelf is disposed in said housing, and
   said insect entry side wall opening being positioned between said bottom and said shelf.

2. The trap of claim 1 including,
   said first securing means being attached to said side wall.

3. The trap of claim 1 including,
   said first securing means comprising an elongated U-shaped channel attached to said side wall and into which said shelf can slide.

4. The trap of claim 3 including,
   said housing including an opposite side wall opposite and spaced from said side wall, and
   said first securing means further comprising a second elongated U-shaped channel attached to said opposite side wall and aligned with said U-shaped channel.

5. The trap of claim 1 including,
   an opposite side wall spaced from said side wall and attached to said top and said bottom, and
   said opposite side wall having at least one insect entry opening through it to the interior of said housing.

6. The trap of claim 1 including,
   a second shelf positionable in said housing spaced from and generally parallel to said shelf, and spaced from said top and said bottom.

7. The trap of claim 1 including,
   a second securing means attached to said bottom for securing said housing to a surface.

8. The trap of claim 7 including,
   said second securing means including said surface being vertical.

9. The trap of claim 7 including,
   said second securing means including said surface being a lower horizontal surface.

10. The trap of claim 7 including,
said second securing means comprising a glue sticker.
11. The trap of claim 1 including,
said housing including a third securing means for releasably securing said end cover in said closed position.
12. The trap of claim 11 including,
said third securing means comprising a snap means.
13. The trap of claim 6 including,
said end cover having at least one insect entry opening through it to the interior of said housing.
14. The trap of claim 1 including,
said top having a plurality of spaced insect entry openings through it to the interior of said housing.
15. The trap of claim 1 including,
said shelf including a removable glue cover removably disposed on said first sticky-insect catching material.
16. The trap of claim 1 including,
said first shelf side including an insect-attracting bait.
17. The trap of claim 1 including,
said insect entry top and side wall openings being elliptical and 1/6 to ⅛ inch in diameter.
18. The trap of claim including,
said housing being formed of a hard, generally crush-resistant material.
19. The trap of claim 18 including,
said housing being able to resist crushing from the weight of objects of twenty pounds.
20. The trap of claim 18 including,
said hard, generally crush-resistant material being a hard plastic.
21. The trap of claim 1 including,
said side wall including a second insect opening through it to the interior of the housing and disposed between said shelf and said top.

* * * * *